US008923608B2

(12) United States Patent
Devin et al.

(10) Patent No.: US 8,923,608 B2
(45) Date of Patent: Dec. 30, 2014

(54) PRE-SCREENING TRAINING DATA FOR CLASSIFIERS

(71) Applicant: Xerox Corporation, Norwalk, CT (US)

(72) Inventors: Vincent Devin, Seyssinet (FR); Mathieu Chuat, Meylan (FR)

(73) Assignee: Xerox Corporation, Norwalk, CT (US)

( * ) Notice: Subject to any disclaimer, the term of this patent is extended or adjusted under 35 U.S.C. 154(b) by 141 days.

(21) Appl. No.: 13/783,581

(22) Filed: Mar. 4, 2013

(65) Prior Publication Data

US 2014/0247978 A1  Sep. 4, 2014

(51) Int. Cl.
*G06K 9/62* (2006.01)
(52) U.S. Cl.
CPC .................................. *G06K 9/6262* (2013.01)
USPC ......................................................... 382/159
(58) Field of Classification Search
USPC ................................................. 382/159, 227
See application file for complete search history.

(56) References Cited

U.S. PATENT DOCUMENTS

| 7,630,977 | B2 | 12/2009 | Gaussier et al. |
| 7,680,341 | B2 | 3/2010 | Perronnin |
| 7,711,747 | B2 | 5/2010 | Renders et al. |
| 7,720,848 | B2 | 5/2010 | Guerraz et al. |
| 8,165,974 | B2 | 4/2012 | Privault et al. |
| 8,189,930 | B2 | 5/2012 | Renders et al. |
| 8,452,778 | B1 * | 5/2013 | Song et al. ..................... 707/748 |
| 2007/0005356 | A1 | 1/2007 | Perronnin |
| 2008/0069456 | A1 | 3/2008 | Perronnin |
| 2009/0144033 | A1 | 6/2009 | Liu et al. |
| 2010/0098343 | A1 | 4/2010 | Perronnin et al. |
| 2010/0318477 | A1 | 12/2010 | Perronnin et al. |
| 2011/0040711 | A1 | 2/2011 | Perronnin et al. |
| 2011/0064301 | A1 | 3/2011 | Sun et al. |
| 2012/0045134 | A1 | 2/2012 | Perronnin et al. |
| 2012/0054658 | A1 | 3/2012 | Chuat et al. |
| 2012/0076401 | A1 | 3/2012 | Sanchez et al. |

OTHER PUBLICATIONS

Perronnin, et al. "Adapted Vocabularies for Generic Visual Categorization", ECCV (4), 2006, pp. 464-475.*
Perronnin, et al. "Fisher kernels on visual vocabularies for Image Categorization" IEEE CVPR, 2007, pp. 1-8.*
Douze, et al. "Combining attributes and Fisher vectors for efficient image retrieval" IEEE Conf. on Computer Vision & Pattern Recognition, 2011, pp. 745-752.*

(Continued)

*Primary Examiner* — Gregory F Cunningham
(74) *Attorney, Agent, or Firm* — Fay Sharpe LLP

(57) ABSTRACT

A system and method provide recommendations for refining training data that includes a training set of digital objects. A submitter labels the digital objects in the training set with labels, which may indicate whether the object is considered positive, neutral, or negative with respect to each of a predefined set of classes. Score vectors are computed by a trained categorizer for each digital object in the labeled training set. From the score vectors, various metrics are computed, such as a representative score vector and distances of score vectors from the representative score vector for a label group, cluster, or category of the categorizer. Based on the computed metrics, heuristics are applied and the training data is evaluated and recommendations may be made to the submitter, such as proposing that mislabeled objects are relabeled. The training data may include unlabeled digital objects, in which case, the recommendations may include suggestions for labeling the unlabeled objects.

33 Claims, 4 Drawing Sheets

(56) References Cited

OTHER PUBLICATIONS

Csurka, et al. "Incorporating Geometry Information with Weak Classifiers for Improved Generic Visual Categorization" ICIAP, 2005, pp. 612-620.

Perronnin, et al. "Large-scale image retrieval with compressed fisher vectors", CVPR, 2010, pp. 1-8.

Perronnin, et al. "Improving the fisher kernel for large-scale image classification" Proc. $11^{th}$ European Conf. on Computer Vision (ECCV): Part IV, 2010, pp. 143-156.

Sanchez, et al. "High-dimensional signature compression for large-scale image classification" CVPR 2011, pp. 1-8.

* cited by examiner

PRE-SCREENING TRAINING DATA FOR CLASSIFIERS

BACKGROUND

The exemplary embodiment relates to the information processing arts, information storage arts, document classification arts, and related arts. It finds particular application in connection with the selection and labeling of a training set for training a categorizer to categorize images or other digital objects and will be described with particular reference thereto.

Digital objects, such as images, speech segments, text documents, and the like are commonly represented as digital files or digital representations, for example as bitmaps or grayscale or color pixel maps in the case of images, audio files in the case of speech segments, text or word processing files in the case of text documents, or hybrid files containing text and images. In the processing and/or storage of such objects, it is useful to categorize (classify according to categories) the objects automatically, with respect to one or more classes or categories. For example, pictorial images can be classified by subject matter, e.g., images of cats, images of dogs, images of vehicles, images of people, and the like.

To facilitate classification, a signature of the object is generated, which may be in the form of a vector having a relatively high dimensionality, i.e., which is sufficient to provide a unique signature for each object, but which incorporates substantially less data than the original object. Thus, for example, an image containing millions of pixels may be represented by a vector having perhaps 128-10,000 dimensions. For images, a suitable vector can be generated by computing features of selected image patches or sampling regions distributed across the image, and employing the computed features as elements of the feature vector or as inputs to a model which assigns a vector based thereon. For images, a Fisher vector or "bag-of-visual-words" vector representation can be used as a suitable vector representation. In the case of text documents, a "bag-of-words" vector representation is sometimes used, in which each vector element corresponds to a word and has a value indicative of a count of occurrences of that word in the text document.

The categorizer receives the vector representation of the object and outputs a classification based on the vector representation. Where there are multiple categories, this can be considered as a series of two class decision problems where each class is evaluated against the rest with a separate categorizer. The classification may be hard (e.g., "1" if the object is assigned to the category or "0" otherwise), or can be soft (e.g., the classification output is a value between 0 and 1 inclusive with higher values indicating a higher confidence of belonging to the category). A soft classification can be converted to a hard classification by thresholding the confidence level. Typically, the categorizer has adjustable parameters whose values are determined by training with a labeled training set. The objective of the training is to select the adjustable parameters such that the output of the categorizer substantially agrees with the classification labels assigned to the objects of the training set.

Broad categorizers have been developed which have been trained to categorize digital objects such as images into a large number of pre-defined categories. Training of such classifiers takes a considerable amount of time and training data. However, even with a large number of trained classes, such classifiers may not always meet a specific user's needs. It is therefore desirable to create custom classifiers for specific users. The training of a custom categorizer, as with any classifier, is computationally intensive. Additionally, the performance of the trained custom categorizer may not be satisfactory, resulting in extensive retraining.

There remains a need for a method for evaluating a training set of labeled objects so that problems are detected prior to training of the custom categorizer.

INCORPORATION BY REFERENCE

The following references, the disclosures of which are incorporated herein by reference in their entireties, are mentioned:

The following references disclose systems and methods for categorizing images based on content: U.S. Pub. No. 2012/0054658, entitled PARAMETERIZATION OF A CATEGORIZER FOR ADJUSTING IMAGE CATEGORIZATION AND RETRIEVAL by Mathieu Chuat and Vincent Devin; U.S. Pat. No. 7,680,341, issued Mar. 16, 2010, entitled GENERIC VISUAL CLASSIFICATION WITH GRADIENT COMPONENTS-BASED DIMENSIONALITY ENHANCEMENT by Florent Perronnin; U.S. Pub. No. 2007/0005356, entitled GENERIC VISUAL CATEGORIZATION METHOD AND SYSTEM by Florent Perronnin; U.S. Pub. No. 2008/0069456 entitled BAGS OF VISUAL CONTEXT-DEPENDENT WORDS FOR GENERIC VISUAL CATEGORIZATION, by Florent Perronnin; U.S. Pub. No. 2009/0144033, published Jun. 4, 2009, entitled OBJECT COMPARISON, RETRIEVAL, AND CATEGORIZATION METHODS AND APPARATUSES, by Yan Liu, et al.; U.S. Pub. No. 2010/0098343, published Apr. 22, 2010, entitled MODELING IMAGES AS MIXTURES OF IMAGE MODELS, by Florent Perronnin, et al.; U.S. Pub. No. 20100318477, published Dec. 16, 2010, entitled FAST AND EFFICIENT NONLINEAR CLASSIFIER GENERATED FROM A TRAINED LINEAR CLASSIFIER, by Florent Perronnin, et al.; U.S. Application Serial No. 20110040711, published Feb. 17, 2011, entitled TRAINING A CLASSIFIER BY DIMENSION-WISE EMBEDDING OF TRAINING DATA, by Florent Perronnin, et al.; U.S. Pub. No. 20120076401, published Mar. 29, 2012, entitled IMAGE CLASSIFICATION EMPLOYING IMAGE VECTORS COMPRESSED USING VECTOR QUANTIZATION, by Jorge Sanchez, et al.; U.S. Pub. No. 20120045134, published Feb. 23, 2012, entitled LARGE SCALE IMAGE CLASSIFICATION, by Florent Perronnin, et al.; U.S. Pat. No. 7,711,747, issued May 4, 1010, entitled INTERACTIVE CLEANING FOR AUTOMATIC DOCUMENT CLUSTERING AND CATEGORIZATION by Renders, et al.; U.S. Pat. No. 7,720,848, issued May 18, 2010, entitled HIERARCHICAL CLUSTERING WITH REAL-TIME UPDATING by Guerraz, et al.; U.S. Pat. No. 8,165,974, issued Apr. 24, 2012, entitled SYSTEM AND METHOD FOR ASSISTED DOCUMENT REVIEW by Privault, et al.; U.S. Pat. No. 8,189,930, issued May 29, 2012, entitled CATEGORIZER WITH USER-CONTROLLABLE CALIBRATION by Renders, et al.; and U.S. Pat. No. 7,630,977, issued Dec. 8, 2009, entitled CATEGORIZATION INCLUDING DEPENDENCIES BETWEEN DIFFERENT CATEGORY SYSTEMS by Gaussier, et al.; Florent Perronnin, et al., "Adapted Vocabularies for Generic Visual Categorization," ECCV (4) pp. 464-475 (2006); Florent Perronnin, et al., "Fisher Kernels on Visual Vocabularies for Image Categorization," IEEE CVPR, (2007); Gabriela Csurka, et al., "Incorporating Geometry Information with Weak Classifiers for Improved Generic Visual Categorization," ICIAP pp. 612-620 (2005); Perronnin, et al., "Improving the fisher kernel for large-scale image classification," in ECCV, 2010; Florent Perronnin, et al., "Largescale image retrieval with compressed fisher vectors,"

in CVPR, 2010; Jorge Sánchez, et al., "Improving the fisher kernel for large-scale image classification," in Proc. 11$^{th}$ European Conference on Computer Vision (ECCV): Part IV, pp. 143-156 (2010), and in Jorge Sánchez and Florent Perronnin, "High-dimensional signature compression for large-scale image classification," in CVPR 2011, the disclosures of which are incorporated herein by reference in their entireties.

BRIEF DESCRIPTION

In accordance with one aspect of the exemplary embodiment, a computer-implemented method for evaluating training data includes receiving training data comprising a labeled training set of digital objects, at least some of the digital objects in the labeled training set including a label indicating that the digital object is positive for a respective class selected from a predetermined set of classes with which a classifier is to be trained. The positively labeled digital objects in the labeled training set are grouped into positive label groups, one positive label group for each class in the set of classes, each label group comprising digital objects having a label indicating the digital object is positive for the respective class. With a trained categorizer, a score vector is assigned to each digital object in the labeled training set of digital objects, the score vector comprising a score for each category of a predetermined set of categories. Heuristics are applied to the training data, based on the assigned score vectors and training data labels, to evaluate the training data for training the classifier. Based on the heuristics, an evaluation of the training data for training the classifier is provided. One or more steps of the method may be implemented by a computer processor.

In another aspect, a system for evaluating training data includes memory which receives training data to be evaluated for use in training a classifier, the training data including labeled digital objects that are labeled with respect to a predefined set of classes. A trained categorizer which has been trained on multiple categories is provided for categorizing the digital objects based on respective representations of the digital objects. The categorizer outputs a score vector comprising a score for each of a predefined set of categories. The set of categories differs from the set of classes. Optionally, a clustering component is provided for identifying clusters of the digital objects based on respective score vectors of the digital objects. A metric component computes metrics for at least one of: label groups, each label group including a set of the digital objects having a common label, category groups, each category group including a set of the digital objects having a common most probable category output by the categorizer, and clusters output by the clustering component. An evaluation component is configured for applying a set of heuristics to the training data based on the computed metrics, the heuristics being selected from the group consisting of: a) a heuristic that identifies overlap between two label groups; b) a heuristic which determines when there is more than one cluster for a label group; c) a heuristic which determines when a label group has a standard deviation which exceeds a standard deviation computed over a plurality of the label groups; d) a heuristic which identifies when a digital object with a label which indicates that the digital object is negative with respect to all classes has a score vector which overlaps at least one label group in which the digital objects are all labeled as positive with respect to a same one of the classes; e) a heuristic which identifies when a digital object with at least one neutral label with respect to one of the classes has a score vector which does not overlap a positive label group in which the digital objects are labeled as positive with respect to the same one of the classes; f) a heuristic which identifies when there is insufficient overlap between unlabeled objects in the training data and the label groups that include digital objects which are labeled as positive with respect to one of the classes; g) a heuristic which identifies when there are unlabeled objects in the training data whose score vectors do not overlap any of the label groups that include digital objects which are labeled as positive with respect to one of the classes; h) a heuristic which identifies when there are unlabeled objects in the training data whose score vectors overlap one of the label groups that include digital objects which are labeled as positive with respect to one of the classes; and i) a heuristic which identifies when there are clusters of labeled objects in the training data that are labeled as negative. A recommendation component is provided for outputting recommendations based on results of the applied heuristics to improve the training data. A processor implements the categorizer, clustering component, evaluation component, and recommendation component.

In another aspect, a computer-implemented method of generating suggestions for modifying a training set of digital objects includes receiving from a submitter, a labeled training set of digital objects. The training set includes a set of classes for identifying content of digital objects. For each digital object in the training set, a plurality of labels is identified, one label for each class, the label for each class indicating that the digital object is positive, negative, or neutral for the respective class. The method includes grouping the digital objects in the labeled training set into positive label groups, one positive label group for each class in the set of classes, each label group comprising digital objects having a label indicating the digital object is positive for the respective class. With a trained categorizer, a score vector is assigned to each digital object in the labeled training set of digital objects, the score vector comprising a score for each category of a set of categories. Heuristics are applied and recommendations are made based thereon. The heuristics include at least one of a fist heuristic that includes computing a representative score vector for each positive label group based on the score vectors of the digital objects in the respective positive label group. A first distance is computed from a first score vector of a digital object of a first of the positive label groups to the representative score vector of the first of the positive label groups. A second distance is computed from the first score vector to the representative score vector of a second of the positive label groups. The first distance is compared to the second distance, and if the first distance is greater than the second distance, the recommendation includes proposing to the submitter at least one of: merging the first and second positive label groups into a common label group and labeling the digital object of the first of the positive label groups be labeled as neutral with respect to the second of the positive label groups. In the second heuristic, a maximum standard deviation is computed as a function of the distance of each score vector in the labeled training set from a central vector. Provision is made for identifying at least two clusters within the negative label group using a clustering algorithm and for computing the standard deviation of each of the two clusters, and comparing the standard deviation of each of the two clusters to the maximum standard deviation. If the standard deviation of at least one of the two clusters is lower than the maximum standard deviation, the recommendation includes making a suggestion is made to the submitter that a new class be added to the set of classes.

DETAILED DESCRIPTION

Aspects of the exemplary embodiment relate to a system and method for improving training data to be used to train a categorizer by providing suggestions and feedback to a user who has submitted the training data.

As used herein a "digital object" (or simply, an "object") refers to a digital item which is capable of being categorized by a digital object categorizer, based on its content. A digital object can be an image, word processing document, audio file, combination thereof, or the like. In the exemplary embodiment, the objects are digital images, in particular, photographic images, i.e., captured images of real world visual (not digital) objects and scenes or images derived therefrom, although other types of images, such as graphics, maps, scanned documents, and the like are also contemplated. While particular reference is made herein to images, it is to be appreciated that the system and method are not limited to images.

A "training set" is a collection of digital objects which is intended to be used as training data for training a digital object categorizer. The digital objects in the training set may be labeled. In one embodiment, the labels can be selected from positive, negative, and neutral for a respective one or more of a set of classes, each label associated with a respective class. The classes identify the content of the class that the new categorizer will be used to categorize. The training data may also include unlabeled objects. For clarity, "labeled training set" will be used to refer to the labeled digital objects and "Universe Representative Set" (URS) will refer to the unlabeled training data. The labeled training set may be used to train the classifier which is then run on the URS to verify that the results are as expected. The intention of the URS is to provide a representative sample of the universe of visual content to which the newly trained classifier will be exposed.

Figure 1:
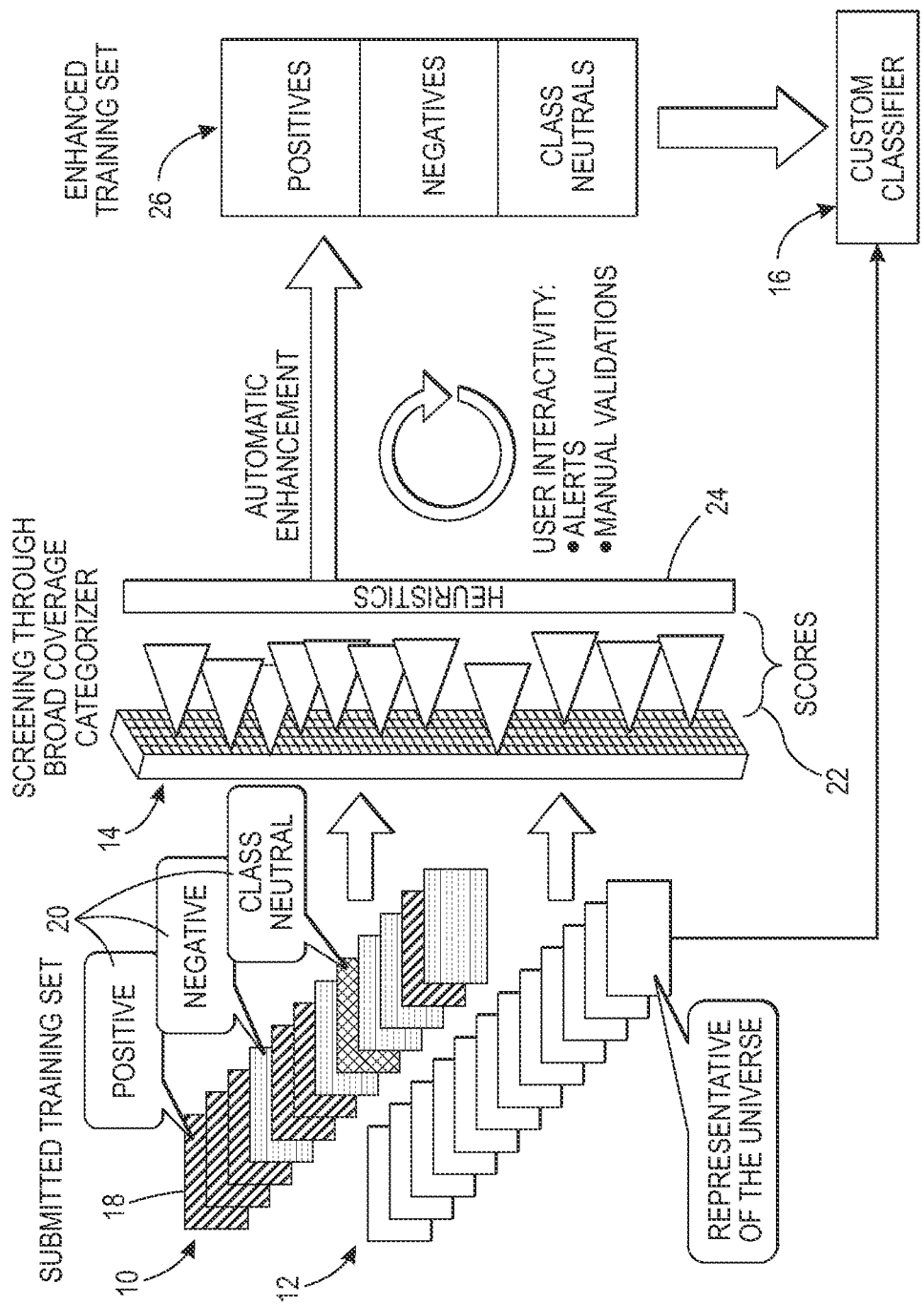
FIG. 1 is an overview of the exemplary system and method.

As illustrated in FIG. 1, a user may provide training data including a labeled training set 10 and an unlabeled URS 12 to a service provider. The service provider has access to a pretrained broad coverage categorizer (classifier) 14, which is configured to predict categories of digital objects based on respective representations of the objects. The categories of the classifier 14 may overlap, in whole or in part, with the classes that the user would like a custom classifier 16 to provide. However, some of the classes the user would like to have may not exist in the broad categorizer 14 or exist as a general category, which the user would like to have in a more fine-grained form. For ease of discussion the classes which are to be trained in the custom classifier are referred to herein as "custom classes" (or simply classes) and the classes that the broad categorizer has been trained to recognize are referred to as "broad categories", or simply categories.

The broad categorizer 14 may employ from 10 to 1000 broad categories, or more, e.g., at least 20 categories, or at least 100 categories, or at least 500 categories. Each category generally describes human-perceptible content of the digital object. Each category has an associated label, such as "beach," "bird", "urban," or "winter sports," which may broadly describe the category, although for some applications, category labels may be alphanumeric sequences, such as the letters of the alphabet. The user may wish to create more specific classes to the existing trained categories or completely different classes. For example, the broad categorizer may include a broad category for "bird," while the user may seek a specific class "parrot." Analyzing the categories provided by the broad categorizer may aid in identifying problems with the provided labeled training set 10. For example, if the labeled training set 10 includes images labeled as parrots, but there are no images similar images in the URS 12, then it would be useful to know that there is little overlap between the class "parrot" and the URS.

A finite set of custom classes is identified, which may correspond to the classes that the submitter would like to recognize with the custom classifier 16. Each digital object 18 in the labeled training set 10 is labeled with one or more manually applied labels 20 which indicate if the object is positive, negative, or neutral with respect to a class. For example a label may identify a digital object in the set 10 as being positive with respect to one of the custom classes. In the exemplary embodiment, the labeled training set objects are labeled with labels that correspond to one or more of the following:

Class-specific positive (CSP): The object is labeled positive with respect to a selected one of the custom classes.

Class Neutral (CN): The object is labeled as neutral with respect to one of the custom classes.

Class-independent Negative (CIN): The object is labeled as negative with respect to all the custom classes.

In some embodiments, each object may be labeled CSP with respect to only one class (class specific positives). In other embodiments, an object may be labeled as positive with respect to more than one class. In general, a positive label for one class indicates that the object is to be considered as negative with respect to all other classes, although in some embodiments, objects may have been manually labeled with negative labels with respect to one or more classes. In the exemplary embodiment, an object which has a CSP label may also have one or more CN labels, but cannot have a CIN label.

The CN label is to account for the fact that some objects may include visual content for two classes (such as birds pictured with trees). The label "class neutral" (or simply "neutral") is assigned to an object to denote that it is not to be considered as negative with respect to one or more of the custom classes. In the exemplary embodiment, an object with a CN label must also have a CSP label for another class and cannot have a CIN label. Most images are only neutral for a small number of classes (e.g., zero, one or two), although it is anticipated that some objects may be labeled neutral for many classes.

The CIN label is for those objects labeled positive with respect to none of the custom classes, and that are thus considered negative with respect to all classes. These CIN objects may be labeled as such, or the CIN status can be inferred from the fact that there is no CSP label for any of the classes.

The encoding of the classes for an object 18 can thus be in any suitable manner which allows the labels to be recorded and/or inferred. In one embodiment, the default status of an object with respect to each class is "negative," and only the CSP and CN status is identified (with the class for which they are positive/neutral). Objects 18 may also be labeled with a list of classes for which they are positive and a list of classes for which they are neutral, with the default for all other classes being negative.

A subset of the digital objects in the labeled training set which are all labeled as positive for the same class is referred to as a positive label group (or sometimes a "label group"). That is, each class has a corresponding positive label group. A label group may initially be empty, implying that there is no training data for a particular class. In some embodiments, this may cause an error message to be sent to the submitter, warning that the system cannot analyze a class without labeled data. The subset of all digital objects in the labeled training set which are labeled CIN is referred to as the negative label group.

The broad categorizer 14 assigns scores to objects, which may be in the form of score vectors 22 (vectors comprised of scores), one score per category for a finite set of categories, such as 10, 20, 50, 100, 500, or more categories. The broad categorizer 14 can thus be used to assign score vectors 22 to objects in the labeled training set 10 and optionally also in the URS 12. As noted, the broad categories and custom classes are expected to be different but may overlap, in part. In assigning score vectors 20, the broad categorizer 14 ignores the CSP, CN, and CIN labels assigned to the labeled training set objects.

In order to train a discriminative classifier 16, it is advantageous for the objects labeled positives and class independent negatives to be selected to create as little overlap as possible. For classes where this cannot be avoided, objects that are properly neutrals should therefore be labeled as such. The training data should also be representative of the universe of objects (e.g., images) that will be submitted for classification by the classifier 16 (e.g., include sufficient images of animals if the classifier is to be used to identify images which include animals). The present system and method help to identify cases where the training data is deficient in some manner which may lead to poor performance of the custom classifier 16.

The training cycle for a custom classifier 16 may be extremely computer intensive (in some cases, taking days or weeks). By providing rapid feedback on the training set through use of an existing broad coverage categorizer 14, before beginning the training of the custom classifier 16, the present system and method can avoid running the training cycle on a sub-optimal training set. The present system applies one or more heuristics 24 to evaluate the labeled training set 10. In particular, clustering techniques, based on the score vectors provided by the broad categorizer, may be used to analyze the training data set 10 and identify deficiencies. These may be used to provide automatic enhancements to the labeled training set 10, e.g., by modifying some of the labels and/or to propose modifications. For example, the user may be provided with alerts which prompt manual validation and/or suggestions as to how to improve the training data set. For example, some objects in the URS 12 may be labeled automatically or suggested to the user as candidates for labeling. Users are aided with warnings of potential problems in their submitted labeled training set 10 and URS 12. Through one or more iterations, an enhanced labeled training set 26 is generated, which can be used to train the custom classifier 16.

Figure 2:
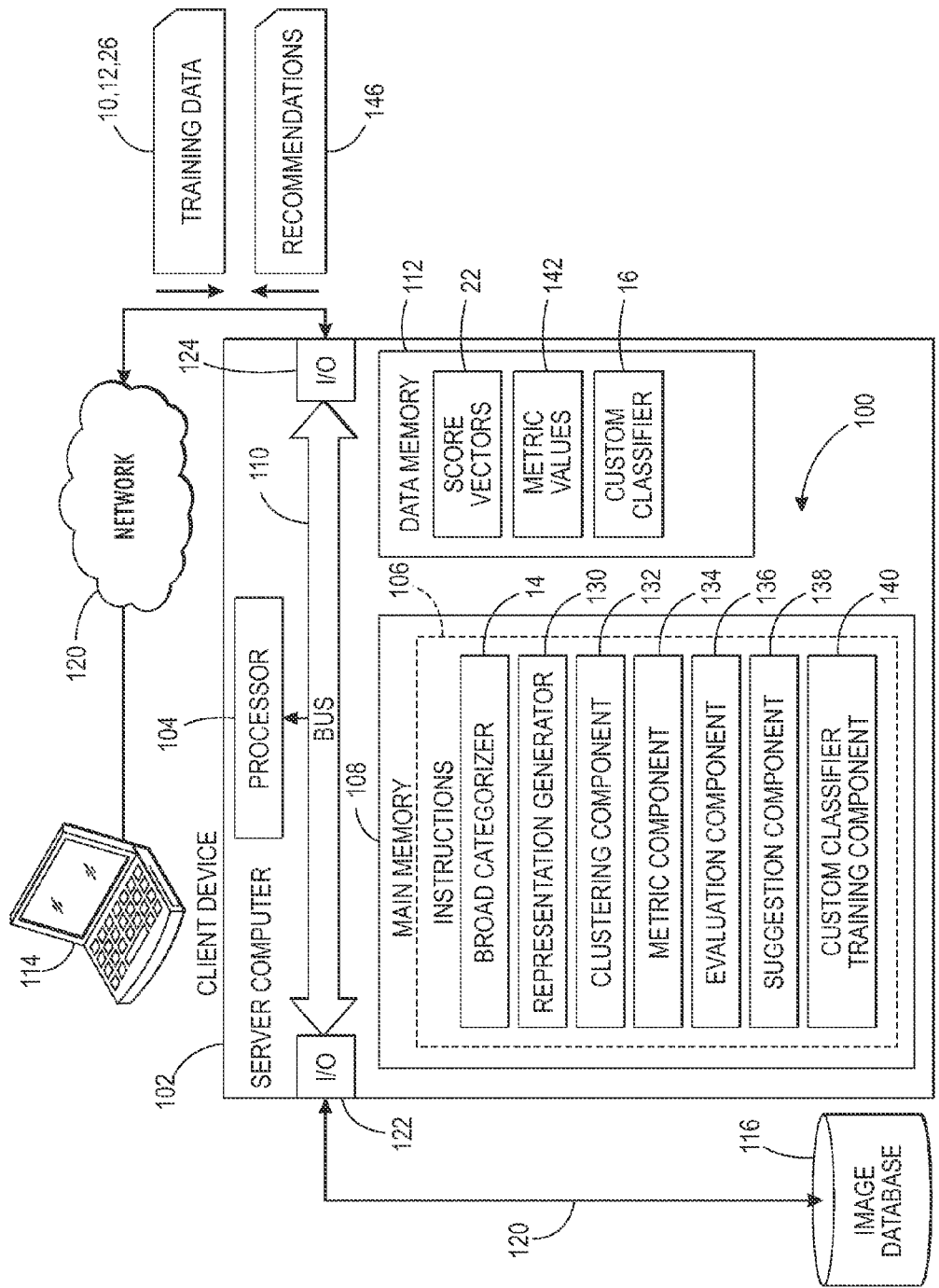
FIG. 2 is a functional block diagram of a system for evaluating training data in accordance with one aspect of the exemplary embodiment.

FIG. 2 illustrates an exemplary computer implemented system 100 for evaluating and providing suggestions to refine the labeled training set 10 in accordance with one aspect of the exemplary embodiment. The system 100 includes a computing device 102, such as the illustrated server computer, server. The server includes a processor 104, which executes processing instructions 106 for implementing the method described below with reference to FIG. 3. The instructions may be stored in main memory 108, which is in communication with the processor 104 via a bus 110. The system may also include data memory 112 to store computed results, such as score vectors 22 and information on the training set based thereon.

A client device 114, used by a human user, provides the system 100 with the labeled training set 10 of digital objects 18 (e.g., images) and labels 20 associated with the digital objects. In some embodiments, the client device 114 also provides a URS 12. The training images 10, 12 may be stored in an image database 116 or in memory 112.

The client device 114 communicates with the server 102 via one or more wired or wireless links 120, such as a local area network or wide area network (e.g., the Internet). The server 102 includes one or more interface devices (I/O) 122, 124 for communicating with external devices, such as the client device 114 via network 120. Devices 122, 124 can include a network interface card having a wired or wireless connection. The server may receive the labeled training set 10 and URS 12 from the client device 114, a web server, a database, a portable memory storage device, a scanner, a camera, or the like and may store the images and labels temporarily in memory 112 during processing.

The exemplary instructions may include the broad categorizer 14, a representation generator 130, a clustering component 132, a metrics component 134, an evaluation component 136, a recommendation component 138, and a custom classifier training component 140.

The representation generator 130 generates a representation of each object in the labeled training set 10 and URS 12, such as a vector, based on features extracted from the object. The representations are input to the broad categorizer 14, which outputs a score vector 22 for each of the digital objects in the labeled training set 10 (and URS 12) based thereon. The generated score vectors 22 may be stored in data memory 112, or in remote memory, such as database 116. The score vectors 22 may first be processed, for example using a noise threshold, to eliminate scores which are below the threshold. The noise threshold(s) may be category dependent (see, for example US2012/0054658 for one method for thresholding the scores).

The clustering component 132 identifies clusters of training images based on their score vectors 22 (e.g., at least two, each cluster including a set of score vectors assigned to the cluster). Additionally, clustering techniques may be used to train the custom classifier, after the labeled training set has been created. See, e.g., U.S. Pat. No. 7,711,747 to Renders, et al., the disclosure of which is incorporated herein by reference in its entirety, for methods of training the classifier.

The metrics component 134 computes values 142 for a set of metrics, described in further detail below, at least some of which are derived from the clusters. The evaluation component 136 applies a set of heuristics 24 to the metric values 142 to identify deficiencies in the training data. The evaluation component also considers the labels 20 with respect to the classes in the evaluation. The recommendation component 138 provides recommendations 146, in human readable form, for improving the training data 10, 12 to address the identified deficiencies, which are output from the system 100. The recommendations 146 may be transmitted to the client device 114 via the network 120. The recommendations may be provided by a GUI or web browser. The recommendations may be used by the submitter to refine the labeled training set and/or URS to provide an enhanced training set 26 which may be returned to the system 100 for reevaluation, as for the initial training data, and/or for use by the custom classifier training component 140 for training the custom classifier 16. The system 100 may also host the custom classifier 16, during training on the enhanced training set 26.

It is to be appreciated that while separate software components 14, 130, 132, 134, 136, 138, 140 are shown, they may be combined or split or interact with remotely located software components in performance of the methods disclosed herein. Processing components 14, 130, 132, 134, 136, 138, 140 may alternatively be in the form of hardware. In some embodiments, one or more of these components may be omitted.

The non-transitory memory 108, 112 may be separate or combined and may represent any type of non-transitory computer readable medium such as random access memory (RAM), read only memory (ROM), magnetic disk or tape, optical disk, flash memory, holographic memory, or other non-transitory memory device. In one embodiment, the memory 108, 112 comprises a combination of random access memory and read only memory. In some embodiments, the processor 104 and memory 108 may be combined in a single chip.

The network interface(s) 122, 124 may be separate or combined and allow(s) the server 102 to communicate with other devices via the computer network 120, and may comprise a modulator/demodulator (MODEM).

The digital processor 104 can be variously embodied, such as by a single-core processor, a dual-core processor (or more generally by a multiple-core processor), a digital processor and cooperating math coprocessor, a digital controller, or the like. The exemplary digital processor 104, in addition to controlling the operation of the server 102, executes the instructions 106 stored in memory 108 for performing the method outlined in FIG. 3.

The client device 114 and server 102 may each comprise one or more general or specific-purpose computing devices, such as a PC, such as a desktop, a laptop, palmtop computer, portable digital assistant (PDA), a server computer, cellular telephone, or other computing device capable of executing instructions for performing the exemplary method. In the exemplary embodiment, the system 100 is hosted by a server computer and is accessed over the Internet via a web browser on the user's computing device 114. However, in other embodiments, some or all of the functionality of the system 100 may be hosted by the client device 114.

As will be appreciated, FIG. 2 is a high level functional block diagram of only a portion of the components which are incorporated into a computer system 100. Since the configuration and operation of programmable computers are well known, they will not be described further.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 3:
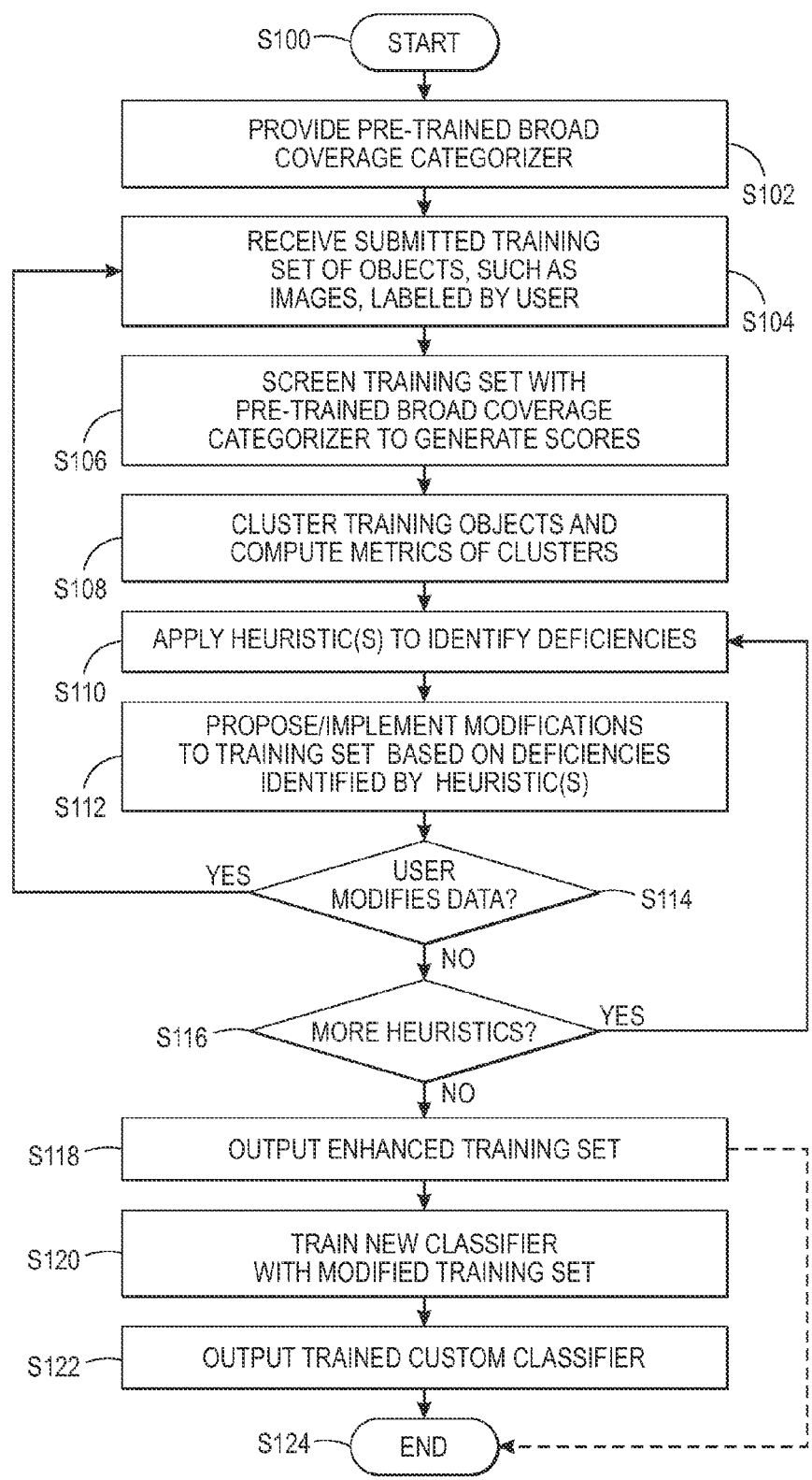
FIG. 3 is a flow chart of a method for evaluating training data in accordance with another aspect of the exemplary embodiment.

An exemplary method is illustrated in FIG. 3. The method starts at S100. At S102, a broad categorizer 14 is provided, which has been pretrained on labeled training samples for a set of categories.

At S104, training data comprising set 10 of labeled objects and an optional URS 12 are received by the system.

At S106, the training data is screened with the broad categorizer 14 to generate a score vector 22 for each digital object in the labeled training set 10. If a Universe Representative Set (URS) 12 is provided, score vectors 22 for the digital objects in the URS may also be generated.

Figure 4:
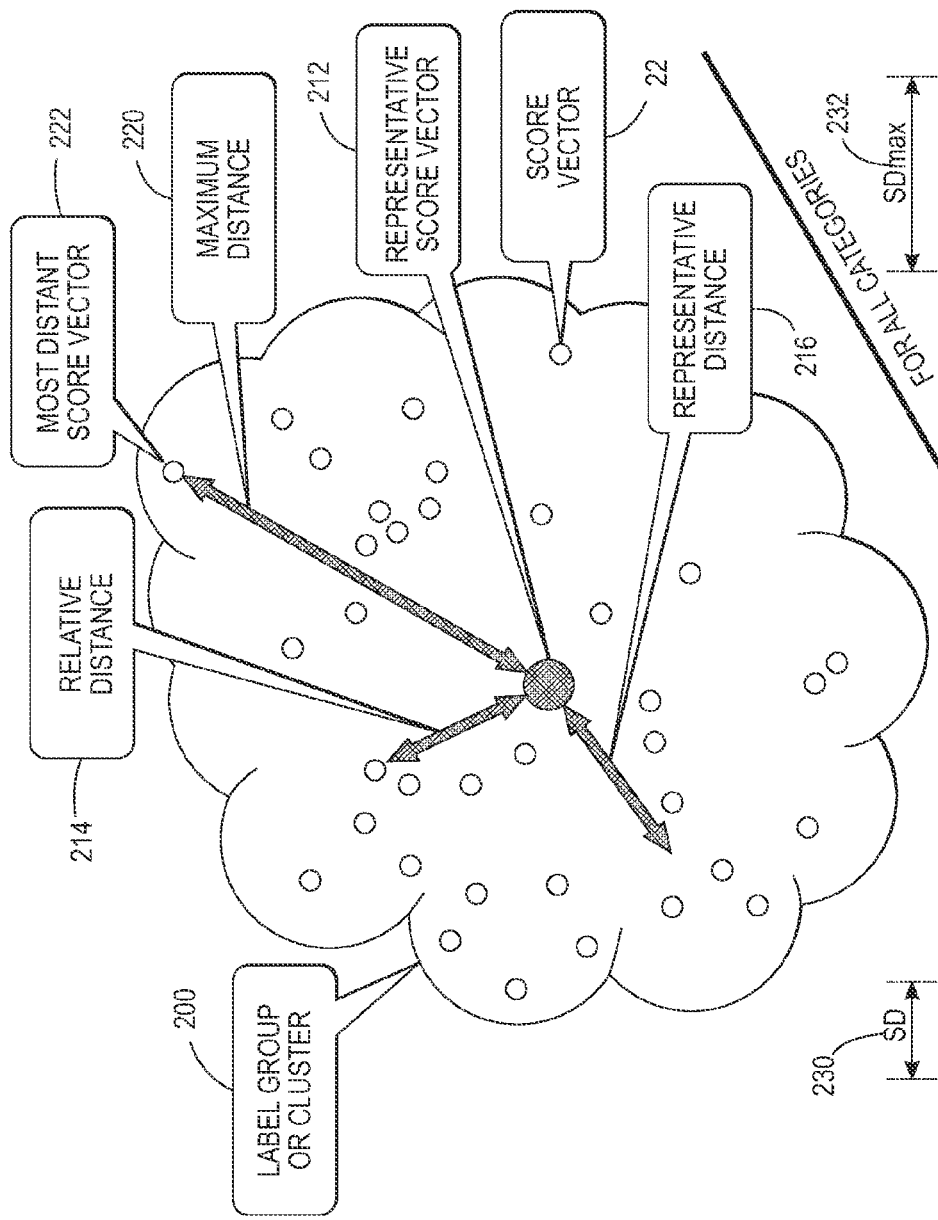
FIG. 4 illustrates metrics computed in the exemplary embodiment.

At S108, objects may be clustered based on their scores, by the clustering component 132. FIG. 4 illustrates an example of a cluster, which is described in greater detail below. Metrics (statistics) are computed based on the clusters.

At S110 heuristics are applied to the metrics computed at S108 to evaluate the training set and to determine deficiencies in the labeled and unlabeled training data 10, 12.

At S112, modifications to the training data 10, 12 are proposed and/or implemented automatically. In the exemplary embodiment, the recommendation component 138 may output a recommendation, based on the results from S110. The recommendation may include an alert, a warning, and/or a suggestion, which may alert the submitter to possible inconsistencies in the submitted data and/or make suggestions for its modification. The system may automatically label (or remove labels from) the training data in order to optimize the quality of the resulting classifier 16. Provision may be made for the user to modify the training data.

At S114, the user may modify the training data 10, 12 to incorporate the recommendations. If the user modifies the training data, then, in one embodiment, the server computer 102 receives the modified training data at S104 and the training data is reprocessed to incorporate the user's changes. In an alternative embodiment, the method continues without recomputing the metrics.

In one embodiment, the heuristics are applied sequentially, with proposals and modifications generated/received after applying each heuristic in turn. In this embodiment, if the user does not make changes at S114 or if a heuristic does not suggest any changes, then at S116, the method checks to see if there are still heuristics left to be applied. If so, the metrics for the next heuristic may be computed at S110 (if not already done) and the heuristic applied. Once all heuristics are applied and all suggestions made, the enhanced training set 26 may be (e.g., new labels for some training set objects, new classes, and so forth) output from the system at S118.

In one embodiment, at S120, the custom classifier 16 is trained on the enhanced training set by the training component 140, and the trained classifier is output from the system. In another embodiment, shown in dashed line, the enhanced training set may be output to the user without being sent to training, allowing the user to verify the training set before the training stage S120.

The custom classifier is trained with the enhanced training set at S122.

The method ends at S124.

The method illustrated in FIG. 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3, can be used to implement the method. As will be appreciated, in some embodiments one or more of the steps may be at least partially performed manually.

Various aspects of the system and method will now be described in greater detail.

Broad Categorizer

The broad categorizer 14 may be any suitable classifier, such as a probabilistic categorizer. In the exemplary embodiment, the broad categorizer 14 includes a classifier model for each of the set of categories. The models are provided by the service provider and have already been trained. The training process for the broad categorizer 14 is similar to the method used to train the custom classifier 16. Specifically, the representation generator 130 generates object signatures for digital objects which have been labeled with respective labels. The labels and corresponding signatures are used to train the models. The method uses the output of the broad categorizer 14 to provide recommendations for refining the training data 10, 12 of the custom classifier 16.

In one embodiment, an object signature is extracted from each digital object 18 in the labeled training set 10 (and URS 12) based on low level features extracted from the object. The model for each category is applied to the signature and outputs a model proximity score e.g., in the range [0,1], which expresses how close the image signature is to the model and, by inference, the confidence level with which the object should be labeled with the category corresponding to the model. A proximity score is produced for each category. The vector of all categories forms a raw score vector.

Thresholds defining minimum scores may be applied to the raw score vectors. Scores below the minimum may be set to a predetermined value (e.g., zero) and those at or above the threshold to another value (e.g., 1 or a scalar value). The minimum scores may be the same or different for each category. Applying the noise threshold to the raw score vectors produces score vectors (SVs) 22 having thresholded scores.

Methods for generating signatures are well known and are described for example, in the references listed above describing categorizing images based on content. Each signature is a statistical representation of low-level features extracted from the object. In the case of text documents, this may be a bag-of-words representation which is based on the occurrences of each of a set of words identified in the object (e.g., following OCR processing). In the case of photographic images, the low level features may be color or gradient features extracted for small patches of the image, e.g., extracted on a grid at multiple scales. Fisher vectors and bag-of visual word representations are examples of the representations which can be generated from the low level features.

Metrics

A cluster, as used herein, is a group of images whose score vectors (SVs) are close, and may be the output of a clustering algorithm. A cluster can be characterized by a centroid and a group of SVs. Methods such as k-means can be used to determine a given number of clusters for the training data or for identifying clusters within a label group of score vectors.

A category group, as used herein is the group of images from the labeled training set 10 which the broad categorizer 14 would assign to that category, e.g., because that category's score in the score vector is the highest. The category score vectors are the score vectors of the images in a category group.

An average, as used herein, can be any one of a mean, a median, or a mode, unless otherwise indicated.

FIG. 4 illustrates metrics that may be computed for a label group 200. The same metrics may be computed for clusters and category groups. FIG. 4 depicts two dimensions, but in practice there are many more dimensions, one per category provided by the broad categorizer 14. In FIG. 4, each small circle represents a score vector 22 for an object in the label group 200 that is labeled positive for the respective class.

A representative (mean) score vector (RSV) 212 is computed for each positive (CSP) label group 200 and may also be computed for each neutral (CN) label group and the negative (CIN) label group. A RSV 212 can also be computed for each cluster. The RSV is based on the set of score vectors 22 in the label group, such as a mean or weighted average of the score vectors 22. In one embodiment, the RSV 212 is computed by averaging each category score (each individual element of the score vectors across a label group or cluster) and constructing a vector of the individual averages. Once a RSV 212 has been computed, a relative distance (RD) 214 for each score vector 210 in a label group 200 (or cluster) to the RSV 212 of the label group 200 is computed. In one embodiment, the relative distance 214 is the Euclidean distance, that is, the square root of the sum of the squares of the differences of each score for each category. Other distances are contemplated (e.g., a sum of the absolute value of the differences of each score, L1 distance (Manhattan distance), chi-squared distance, cosine similarity, Hamming distance, or the like).

A representative (mean) distance (MRD) 216 is computed based on the relative distances 214 for the images in label group (or cluster). The MRD 216 may be computed by averaging (e.g., computing an unweighted arithmetic mean of) the RDs 214, but other methods of computing the MRD are contemplated, such as a weighted average or median of the RDs.

From the RDs 214, a maximum distance (MD) 220 may also be computed. This is the distance from the RSV 212 to the most distant score vector 222 in the label group 200 (or cluster).

A standard deviation (SD) 230 of each label group 200 is computed by computing the distances of each score vector 210 in the label group 200 to a central vector which is, in one embodiment, the zero vector (a vector having a zero value for each category), and computing a standard deviation of these distances.

The SD for each category is computed from the scores for that category group (e.g., the element of the score vectors corresponding to that category).

Maximum standard deviation, SDmax 232, represents a standard deviation which is computed based on score vectors for digital objects in more than one of the label groups/categories, such as the maximum SD over some or all positive label groups or over some or all categories. SDmax may be a function of the distance of each score vector in the labeled training set from a central vector, such as a vector which has a value of 0 for all dimensions.

Heuristics

A variety of heuristics may be applied based on the computed metrics, and other factors to evaluate the training data 10, 12. The results of the heurists may be used to make suggestions to the submitter and/or to make automatic changes to the training data labels. Some of the suggestions given to the submitter rely on the same metrics. If the metric has already been computed and the training data 10 is not modified, it is not necessary to re-compute the metric for a later stage of the method.

The noise threshold may function as a preliminary warning. If less than a predetermined proportion (e.g., 50%) of the score vectors 22 are above the noise threshold, this implies that the classes being trained may be outside the scope of the existing categories for the existing broad categorizer 14. That is, the broad categorizer scores 22 are scoring content, but that content is so unrelated to the content of the desired custom classifier that the heuristics are unlikely to be helpful. Few scores above a noise threshold may also be a sign of low visual consistency among the digital objects (e.g., images). The recommendation component 138 may offer the submitter a suggestion that the user should bypass the rest of the heuristics and launch the training stage without improvement.

Other example heuristics are as follows:

1. CSP Label Groups Overlap:

If the evaluation component 136 detects overlap between the score vectors 22 of the digital objects that are labeled positive for two (or more) classes, the recommendation component 138 may propose to merge or split the overlapped classes or, in an embodiment which uses neutrals, the recommendation component 138 may propose labeling the overlapping digital objects as neutrals for the class for which they are not labeled as positive. To determine overlap, the evaluation component 136 uses the computed RSVs 212 and RDs 214. A score vector 22 of a first label group is selected. A second label group is also selected. The second label group may be selected by picking the label group (excluding the first label group) having the closest RSV 212 to the selected score vector. The evaluation component 136 computes a second distance from the selected score vector to the RSV 212 of the second label group. If the RD is less than the first label group's RSV (i.e. the score vector is closer to the RSV of another label group than to its own RSV), then the recommendation component 138 may suggests to the submitter one of: (a) the label groups should be merged and all digital objects in both label groups be labeled as positive for the same classes, (b) the label for the object should be changed to positive for the other class and negative or neutral for its original class, and (c) the digital object should be labeled as neutral with respect to the second class.

2. Plural Clusters in a Label Group:

This heuristic computes the size of each cluster (e.g., as measured by the variation in RDs 214 or by the number of score vectors 22 contained in the cluster) generated from a label group by the clustering component. Depending on the size of a cluster, a suggestion may be given to the submitter, such as to consider labeling some of the digital objects with a different label, removing a positive label for a class from a digital object, or adding an additional class to the set of classes if a class could be split into two labels.

For example, if the evaluation component 136 identifies two or more clusters having a smaller standard deviation 230 than SDmax 232 within a positive label group 200, it may suggest splitting the positive label group 200. The clusters are identified by clustering component 132 using a clustering algorithm such as k-means. Generally, the method will attempt to identify two clusters, although it is contemplated that more may be identified. Once two clusters are identified, the standard deviation 230 of both clusters may be computed. If either is less than SDmax 232, the recommendation component 138 may suggest adding a new class to the set of classes which would correspond to the cluster. The recommendation component 138 may suggest a class name by computing the RSV 212 and providing the category having the highest score in the RSV of the cluster. In an embodiment which classifies images, the recommendation component 138 may show digital images from the cluster to the submitter and allow the submitter to select a new class name for the cluster. The recommendation component 138 may select images such as, for example, images having score vectors 22 close to the RSV 212, as computed using the Euclidean distance. The recommendation component 138 may also indicate if a cluster is large enough to serve as a new class, i.e. include above a threshold number of digital objects. For example, if the cluster is smaller in size than the other label groups (e.g., has fewer score vectors than the average of the other label groups), the recommendation component 138 may suggest gathering additional digital objects which would be labeled positive for a new class based on the cluster.

3. Low Visual Consistency:

The evaluation component 136 may detect a positive label group 200 having low consistency. In the case of images, this would indicate low visual consistency. This is indicated by the standard deviation (SD) 230 for the label group being bigger than SDmax 232. This may indicate that the labeled training set 10 is not consistent enough to provide good training data. It may also be due to the training data 10 having little content that would be identified by the existing broad categorizer 14. The recommendation component 138 may provide a warning that the training data 10 for the class (the label group) has low consistency.

4. Overlap Between the CIN and a CSP Label Group:

The evaluation component 136 may identify overlap between class independent negatives (CINs) and a positive label group. The evaluation component 136 computes a negative distance (ND), which is defined as the distance (e.g., Euclidean distance) of a CIN-labeled score vector to the RSV of a positive label group. If the distance is less than the maximum distance MD for the positive label group, the system may suggest that the submitter (a) confirm the CIN label, (b) relabel the digital object 18 with the class corresponding to the label group, or (c) remove the digital object 18 from the labeled training set 10.

5. No Overlap Between a CN and a Label Group:

In an embodiment having neutrals, the evaluation component 136 may suggest that some class neutral (CN) labeled digital objects are unnecessarily labeled as CN. This is detected when a CN score vector is not similar to the RSV of the label group of the class for which it is labeled CN. This may be determined by computing the distance from a CN labeled score vector to the RSV 212 of the label group for which the digital object is neutral and comparing this distance to the average distance of all the digital objects in the label group to the RSV. If the CN distance is less, the recommendation component 138 may ask the user to (a) confirm the CN label, (b) remove the label, or (c) remove the digital object 18 from the labeled training set 10. Alternatively, the evaluation component 136 may remove the label or remove the digital object 18 from the labeled training set 10 automatically, without confirmation from the user.

6. Insufficient Overlap Between URS and a CSP Label Group:

In an embodiment where a Universe Representative Set (URS) 12 is provided, the recommendation component 132 may determine there is little overlap between the URS 12 and one or more label groups in the labeled training set 10. This is detected if there are few (e.g., zero or less than a percentage such as 1 or 10 percent) objects in the URS 12 having a score vector closer to the RSV 212 of a positive label group 200 than the MRD 216 for the label group 200. The recommendation component 138 may point out the class that has few (or zero) overlapping score vectors with objects in the URS 12 and thus that the URS is not representative of those classes.

7. No Overlap Between URS and any CSP Label Group:

The evaluation component 136 may also detect specific digital objects in the URS 12 that are problematical in that they are distant from all positive label groups. This condition is identified by computing the distance from a score vector of an object in the URS 12 to the RSV 212 of a positive label group and comparing the computed distance to the MD 220 of the positive label group. If an object in the URS 12 is more distant from each CSP label group than the MD for each label group, then the recommendation component 138 may suggest labeling the object as a CIN or automatically label the object as a CIN. The evaluation component 136 may also remove the object from the URS 12.

8. Overlap Between URS and any CSP Label Group:

The recommendation component 138 may suggest labeling (or the evaluation component 136 may automatically label) objects in the URS 12 as positives for a particular class. To accomplish this, the evaluation component 136 computes the distance from the score vector of an object in the URS 12 to the RSV 212 of a positive label group 200. This may be repeated for all objects in the URS 12 for all positive label groups. If the computed distance is less than the MRD 216 for the label group 200, the recommendation component 138 suggests to the submitter that the corresponding digital object of the URS 12 be labeled as positive with respect to the class of the CSP label group, added to the labeled training set 10 (and removed from the URS 12), or the evaluation component 136 may automatically label the object, without user intervention. The object may be within the average distance of multiple RSVs, in which case evaluation component 136 identifies the closest. The recommendation component 138 presents the closest to the submitter. Alternatively, the recommendation component 138 may present an ordered list to the submitter or present several of the closest (e.g., the classes corresponding to the three closest RSVs). The evaluation component 136 may automatically label the object with the closest RSV, e.g., as computed using the Euclidean distance.

9. Clusters within a CIN Label Group:

In addition to identifying when a plurality of clusters exist in each positive label group, the clustering component 132 also identifies clusters in the CIN (negative) label group, using, for example, a clustering technique such as k-means. The clustering component 132 seeks to identify at least two clusters and calculates the standard deviation 230 for at least one cluster. If the standard deviation 230 is less than SDmax 232, the recommendation component 138 may suggest that the submitter adds an additional class and identify the category having the highest score for the RSV of the cluster as a candidate new class. If the cluster has a similar number of entries as the existing positive label groups, the recommendation component 138 may propose to add the class and label the objects in the cluster as positives. If the cluster is smaller in size than existing positive label groups (includes fewer score vectors than the average of the existing label groups), the recommendation component 138 may suggest gathering positives for the new class. The cluster may also be added automatically, using the category as the class.

TABLE 1 summarizes the detected conditions for the set of heuristics, some or all of which may be employed in the exemplary method, and the recommendations which may be proposed to the submitter. As discussed above, the following abbreviations are used: CSP=class specific positive, CN=class neutral, CIN=class independent negative, SV=score vector, MRD=representative (mean) distance, RSV=representative (mean) score vector, MD=maximum distance, SD=standard deviation, SDmax=maximum SD, and LG=label group.

TABLE 1

| DETECTED CONDITION | MEASUREMENT | INTERPRETATION | RECOMMENDATION |
| --- | --- | --- | --- |
| 1. There is overlap between some CSP LGs. | The SV of at least one CSP LG is closer to the RSV of another LG than of its own LG. | This may imply that distinguishing between the submitted classes is difficult and that additional actions would improve the performance of the custom classifier. | Propose (a) to merge and/or split categories with overlap and/or (b) to ensure that such overlapping digital objects are labeled as neutral with respect to one of the LGs. |
| 2. There are Clusters in a CSP LG. | At least two Clusters have smaller standard deviations (SD) than SDmax. | This implies that there is visual consistency within a LG. | Propose that a class be added. Display a sample for each cluster and an indication of the size of the cluster. The recommendation component may also suggest a possible class by providing the category having the greatest score in the existing categories. |
| 3. There is low consistency within a CSP LG. | The SD for all of a LG is bigger than SDmax. | This implies that the training data for this class has below average consistency, which could lead to poor training. | Point out such classes as possibly having below average consistency. |

TABLE 1-continued

| DETECTED CONDITION | MEASUREMENT | INTERPRETATION | RECOMMENDATION |
|---|---|---|---|
| 4. There is overlap between CINs and a LG. | The SV of at least one CIN is closer to the RSV of a CSP LG than the MD of the CSP LG. | This may imply that there are some training images mislabeled as CINs. | Point out all possibly mislabeled CINs and identify/display the overlapping CSP LG. For each mislabeled CIN, the submitter is asked to (a) confirm the CIN label, (b) move it to the CSP LG, or (c) remove the image from the labeled training set. |
| 5. There is no overlap between a neutral and the LG for which it is labeled neutral. | The SV of a neutral is more distant from the RSV of a LG for which it is labeled neutral than the mean for the LG | This may imply that there are some training images mislabeled as neutrals. | Point out the mislabeled neutral and class for which it is neutral. The submitter has the option to (a) confirm the neutral label, (b) remove the neutral label, or (c) remove the digital object from the labeled training set. |
| 6. There is not enough overlap between the URS and some CSP LGs. | No URS SV is closer to the RSV of a CSP LG than the average distance for such LG. | This may imply that the URS is not representative of the universe of content that the newly trained classifier will be exposed to. | Point out the classes absent from the URS. |
| 7. There are objects in the URS with no overlap with any CSP LG. | There are some URS SVs that are more distant from the RSV of any CSP LG than the MD of the CSP LG | This implies that some unlabeled data could be labeled. | Suggest labeling (or automatically label) as negatives the objects in the URS with SVs with no overlap with any CSP LG. |
| 8. There are images in the URS that overlap with a CSP LG. | There are some URS SVs that are closer to the RSV of a CSP LG than its average distance. | This implies that some unlabeled data could be labeled. | Suggest that any object in the URS with overlap with a CSP LG be labeled as a possible CSP for the class of the LG. The submitter may (a) confirm the CSP label by selecting one of such overlapping classes, (b) chose another class, or by default (c) the system automatically labels the object as a CSP for the class having the closest RSV. |
| 9. There are clusters in the negative LG. | At least two Clusters in the negative LG have a smaller SD than SDmax. | This implies that there is consistency in the negative LG, and new classes could be added. | Suggest some name(s) for such additional classes by providing the category having the highest score in the RSV of the cluster. If such cluster is smaller in size than the submitted categories, suggest gathering additional positives. If the cluster is large enough, propose a class name and adding it as a class, with the objects in the cluster labeled as CSPs for that class. |

In one embodiment, at least two, or at least three, or at least four, or at least five of the exemplary heuristics are employed.

Examples of the cases in TABLE 1 are provided in TABLE 2. The examples are for an embodiment in which the digital objects are images. Assume that the Broad categorizer includes at least 100 categories including a large number of animal categories, including Dog, Cat, Monkey, Panda, Dolphin, as well as other visual categories, which have been trained on CSP-labeled images of these categories and possibly also on negative samples from other categories.

TABLE 2

Example Cases

| # | ILLUSTRATIVE CASE | MEASURED EVIDENCE | COMMENTS | PROPOSED ENHANCEMENT |
|---|---|---|---|---|
| 1 | Submitter wants to train two classes, Dalmatian and | The categorizer does not include such precise categories. The closest ones are Dogs and | Most of the mislabeled training data is detected. | Propose to correct the mislabeled images by showing them to the user with |

TABLE 2-continued

Example Cases

| # | ILLUSTRATIVE CASE | MEASURED EVIDENCE | COMMENTS | PROPOSED ENHANCEMENT |
|---|---|---|---|---|
| | Chimpanzee. The Dalmatian training data contains 499 images of the dog and 100 mislabeled images of chimpanzees. The Chimpanzee training data contains 601 images of the monkey and 90 mislabeled images of dalmatians | Monkeys. Nevertheless, 98 of the mislabeled Chimpanzee SVs and only 1 Dalmatian SV in the Dalmatian Training Data are closer to the Chimpanzee RSV than the Dalmatian RSV in the training data. Furthermore 89 of the mislabeled Dalmatian SVs and 37 Chimpanzee SVs in the Chimpanzee Training Data are closer to the Dalmatian RSV than the Chimpanzee RSV Training Data. | | the new suggested labels. |
| 2 | Submitter wants to train two classes, French Animals and Exotic Animals. French Animals contains 1073 images of deer and Exotic animals 681 images of dolphins and 942 images of pandas. | The SD for French animals is 0.0027 (<SDmax) but the SD for Exotic animals is 0.0030 (>SDmax). Clustering by kmeans (k = 2) on Exotic animals LG returns 2 clusters. Cluster 1 contains 579 SVs of Dolphins with a SD of 00028 (<SDmax). Cluster 2 contains 670 SVs of Pandas and 2 of Dolphins with a SD of 0.0026 (<SDmax). | This implies that there is some visual consistency within parts of Exotic Animals and it can be split into two categories. | Display a sample for each cluster and suggest Dolphin and Panda, which are the closest categories in the set of existing broad coverage categories, as labels. |
| 3 | Submitter wants to train the same two classes - French Animals and Exotic Animals. The user does not accept the split suggested by rule 2. | The SD for French animals is 0.0027 (<SDmax) but the SD for Exotic animals is 0.0030 (>SDmax). | This implies that the training data for Exotic animals is below average from a visual consistency standpoint, which could lead to unbalanced performance. | Point out Exotic Animals as possibly below average in terms of visual consistency. |
| 4 | Submitter wants to train two classes: Dalmatian and Chimpanzee. The Dalmatian training data contains 499 images and the Chimpanzee training data contains contain 601 images. As CINs, the user suggests 681 images of dolphins, 90 images of Dalmatians, and 100 images of chimpanzees. | 99 chimpanzees SVs of the CINs are closer to the Chimpanzee CSP RSV than its most distant SV and 85 dalmatian SVs of the CINs are closer to the Chimpanzee CSP RSV than its most distant SV. | This may imply that there are some training images mislabeled as negatives. | Propose to correct the mislabeled images by showing them to the user with the new suggested labels (Dalmatian CSP and Chimpanzee CSP). |
| 5 | Submitter wants to train three classes: Zebra (with 770 images), River (with 228 images) and Siamese cats (with 280 images). | 31 SVs of the Zebra LG are closer to the River RSV than the MRD for River LG while the 739 others are further. All 228 SVs for the River training set are further than the MRD for Zebra. | This may imply that there are some training images of Zebra and River mislabeled as neutrals. | Point out all alleged mislabeled neutrals Zebra and River. For each such alleged mislabeled neutral, the user is asked to (a) confirm the neutral label, (b) remove the neutral |

TABLE 2-continued

Example Cases

| # | ILLUSTRATIVE CASE | MEASURED EVIDENCE | COMMENTS | PROPOSED ENHANCEMENT |
|---|---|---|---|---|
| | The submitter has chosen to indicate all Zebra and River images as neutral (CN) to each other. | | | label from the labeled data, or (c) remove the image from the labeled training set. |
| 6 | Submitter wants to train three classes: Dalmatian (with 499 images), Chimpanzee (with 601 images) and Zebra (with 770 images). The URS unlabeled data consists of 100 chimpanzee images, 90 dalmatian images and 681 dolphin images. | No URS SVs are closer to the RSV of the Zebra class than its MRD. | This may imply that the URS is not representative of the universe of visual content as the Zebra CSP LG is under-represented. | Point out the Zebra CSP labels as absent from the URS. |
| 7 | Same case | 1 dalmatian URS SV and 423 dolphin URS SVs are more distant from the RSV of any CSP LG than the MD for such LG | This implies that some unlabeled data could be labeled. | The 424 images (1 dalmatian and 423 dolphins) in the URS are automatically labeled as negatives, and the user may validate this. |
| 8 | Same case | 43 chimpanzee URS SVs are closer to the RSV of the Chimpanzee CSP LG than its RSV (along with 1 dalmatian and 45 dolphins). 41 dalmatians URS SV are closer to the RSV of the Dalmatian LG than its MD (along with 1 chimpanzee and 75 dolphins). No URS SVs are closer to the RSV of the Zebra LG. | This implies that some unlabeled data could be labeled. | All images in the URS with overlap with Chimpanzee and Dalmatian LGs are pointed out as a possible CSP. The user may (a) confirm the positive label of such by selecting one of the overlapping CSP labels, (b) chose another CSP label, or by default (c) the system automatically selects the CSP label which is closest. |
| 9 | Submitter wants to train one class - Deer - with 1,073 images. As CINs, the user provides 681 images of dolphins and 942 images of pandas. | Clustering with kmeans (k = 2 clusters) on the CIN SVs returns 2 clusters. Cluster 1 contains 579 SVs of Dolphin with a SD of 00028 (<SDmax). Cluster 2 contains 670 SVs of Panda and 2 of Dolphin with a SD of 0.0026 (<SDmax) | This implies that there is visual consistency in the CIN LG, and possibly new classes could be added. | Display a sample for each cluster and suggest Dolphin and Panda, which are the closest categories in the set of existing categories from the broad categorizer. |

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method for evaluating training data comprising:
receiving training data comprising a labeled training set of digital objects, at least some of the digital objects in the labeled training set including a label indicating that the digital object is positive for a respective class selected from a predetermined set of classes with which a classifier is to be trained;
grouping the positively labeled digital objects in the labeled training set into positive label groups, one positive label group for each class in the set of classes, each label group comprising digital objects having a label indicating the digital object is positive for the respective class;
with a trained categorizer, assigning a score vector to each digital object in the labeled training set of digital objects, the score vector comprising a score for each category of a predetermined set of categories;

applying at least one heuristic to the training data to evaluate the training data for training the classifier based on the assigned score vectors and training data labels; and based on the at least one heuristic, providing an evaluation of the training data prior to training the classifier.

2. The method of claim 1, wherein applying the at least one heuristic to the training data includes applying a heuristic comprising:

for each positive label group, computing a representative score vector based on the score vectors of the digital objects in that positive label group;

computing a first distance from a first score vector of a digital object of a first of the positive label groups to the representative score vector of the first of the positive label groups;

computing a second distance from the first score vector to the representative score vector of a second of the positive label groups; and comparing the first distance to the second distance.

3. The method of claim 2, wherein when the first distance is greater than the second distance, the evaluation includes proposing that that the first and second positive label groups be merged into a common label group.

4. The method of claim 2, wherein the first distance and the second distance are Euclidean distances.

5. The method of claim 1, wherein each digital object in the labeled training set is labeled as positive for at most one of the classes.

6. The method of claim 1, wherein the digital objects are images.

7. The method of claim 1, further comprising generating a signature for each digital object in the training set, the assigned score vector being based on the signature.

8. The method of claim 1, wherein the assigning of the score vectors further comprises setting initial scores in each score vector that are below a noise threshold to a new value which indicates the value is below the noise threshold.

9. The method of claim 8, wherein the evaluation comprises outputting a recommendation when the scores of score vectors of at least a proportion of the digital objects in the labeled training set are below the noise threshold.

10. The method of claim 1, wherein the applying the at least one heuristic to the training data further comprises:

computing a maximum standard deviation (SDmax) based on the score vectors of all the positively labeled digital objects in the labeled training set.

11. The method of claim 10, wherein SDmax is based on distances of the score vectors of all the digital objects in the labeled training set to a same predefined vector.

12. The method of claim 11, wherein SDmax is a function of the Euclidian distance of each score vector in the labeled training set from the predefined vector.

13. The method of claim 10, wherein the applying the at least one heuristic to the training data comprises applying a heuristic which comprises:

computing a standard deviation for a given positive label group as a function of the distance of the score vector of each digital object in the given positive label group to a representative score vector for the given positive label group; and comparing the standard deviation of the given positive label group to SDmax; and wherein the evaluation optionally includes outputting a recommendation when the given positive label group has a standard deviation greater than SDmax.

14. The method of claim 13, wherein the representative score vector for the given positive label group is computed as a function of the score vectors of the score vectors of the digital objects in the given positive label group.

15. The method of claim 13, wherein the standard deviation of the given positive label group is a function of the Euclidian distance of the score vector of each digital object in the given positive label group to the representative score vector for the given positive label group.

16. The method of claim 10, wherein the applying the at least one heuristic to the training data comprises applying a heuristic which comprises:

for at least one positive label group, computing a standard deviation as a function of distances of the score vectors of the digital objects in the respective positive label group to a representative score vector for the respective positive label group; and comparing the standard deviation of each positive label group to SDmax; and where the evaluation optionally includes outputting a recommendation when at least one of the positive label groups has a standard deviation greater than SDmax.

17. The method of claim 10, wherein the applying the at least one heuristic to the training data comprises applying a heuristic which comprises:

identifying, for at least one of the positive label groups, at least two clusters within the positive label group;

computing a standard deviation of each of the two clusters; and comparing the standard deviation of each of the two clusters to SDmax; and where the evaluation optionally includes outputting a recommendation when the standard deviation of at least one of the two clusters is lower than SDmax.

18. The method of claim 17, further comprising identifying a centroid of the at least one cluster, and at least one of:

identifying at least one digital object of the training data, having a score vector that is close in distance to the centroid of the cluster; and suggesting a name based on a predefined category from the categorizer's categories having a highest score in the score vector of the centroid.

19. The method of claim 1, wherein at least some of the digital objects in the labeled training set include a label indicating that the digital object is negative with respect to all classes in the set of classes, and at least one of the at least one heuristic relates to the negatively-labeled objects.

20. The method of claim 19, wherein at least one of the heuristics which relates to the negatively-labeled objects comprises:

grouping the negatively labeled digital objects in the labeled training set into a negative label group;

with the trained categorizer, computing a score vector for each of the digital objects in the negative label group;

for at least one positive label group, identifying a most distant score vector in the at least one positive label group from the representative score vector of the respective label group;

computing a maximum distance based on a distance from the identified most distant score vector to the representative score vector of the at least one positive label group;

computing a negative distance based on a distance from a negatively labeled score vector in the negative label group to the representative score vector of the at least one positive label group; and comparing the maximum distance to the negative distance; and wherein the evaluation optionally includes recommending that the negatively labeled score vector be labeled as positive with respect to the at least one positive label group when the negative distance is less than the maximum distance.

21. The method of claim 19, wherein at least one of the heuristics which relates to the negatively-labeled objects comprises:
computing a maximum standard deviation (SDmax) based on the score vectors of all the positively labeled digital objects in the labeled training set;
identifying at least two clusters within a negative label group, the negative label group comprising objects in the training set that are negatively labeled with respect to all the classes; and
computing a standard deviation of each of the two clusters, and comparing the standard deviation of each of the two clusters to SDmax; and,
wherein the evaluation optionally includes recommending that a new class be added to the set of classes when the standard deviation of at least one of the two clusters is lower than SDmax.

22. The method of claim 1, wherein at least some of the digital objects in the labeled training set include a label indicating that the digital object is neutral with respect to one of the classes in the set of classes, the applying of the at least one heuristic comprising applying a heuristic configured for identifying at least one of:
a neutral labeled digital object having a score vector that is not sufficiently close to score vectors of other digital objects with the same neutral label;
and a neutral labeled digital object having a score vector that is not sufficiently close to score vectors of other digital objects in a positive label group which includes the neutral labeled digital object; and
wherein the evaluation optionally includes providing for identifying the neutral labeled digital object and outputting a recommendation based on the applied heuristic.

23. The method of claim 1, wherein the received training data comprises a set of unlabeled digital objects, the method further comprising:
with the categorizer, assigning a score vector to each digital object in the set of unlabeled digital objects, the score vector comprising a score for each category of the set of categories; and
wherein the applying of the at least one heuristic comprises applying a heuristic configured for identifying at least one class which is not represented in the set of unlabeled digital objects.

24. The method of claim 1, wherein the evaluation comprises providing for recommending at least one of:
confirming or changing a label of at least one of the digital objects in the labeled training set;
removing a digital object from the training data;
adding a class to the set of classes;
adding digital objects to the training set for at least one of the positive label groups; and
labeling an unlabeled digital object in the training data with one of the classes.

25. The method of claim 24, further comprising training the classifier with the training data that has been modified based on at least one of the recommendations.

26. A system comprising memory which stores instructions for performing the method of claim 1 and a processor in communication with the memory for executing the instructions.

27. A computer program product comprising a non-transitory recording medium storing instructions, which when executed by a processor, perform the method of claim 1.

28. A system for evaluating training data comprising:
memory which receives training data to be evaluated for use in training a classifier, the training data including labeled digital objects that are labeled with respect to a predefined set of classes;
a trained categorizer for categorizing the digital objects based on respective representations of the digital objects, the categorizer outputting a score vector comprising a score for each of a predefined set of categories, the set of categories differing from the set of classes;
optionally, a clustering component for identifying clusters of the digital objects based on respective score vectors of the digital objects;
a metric component which computes metrics for at least one of:
label groups, each label group including a set of the digital objects having a common label;
category groups, each category group including a set of the digital objects having a common most probable category output by the categorizer; and
clusters output by the clustering component;
an evaluation component which is configured for applying a set of heuristics to the training data based on the computed metrics, the set of heuristics comprising at least one heuristic selected from the group consisting of:
a) a heuristic that identifies overlap between two label groups;
b) a heuristic which determines when there is more than one cluster for a label group;
c) a heuristic which determines when a label group has a standard deviation which exceeds a standard deviation computed over a plurality of the label groups;
d) a heuristic which identifies when a digital object with a label which indicates that the digital object is negative with respect to all classes has a score vector which overlaps at least one label group in which the digital objects are all labeled as positive with respect to a same one of the classes;
e) a heuristic which identifies when a digital object with a neutral label with respect to at least one of the classes has a score vector which does not overlap a positive label group in which the digital objects are labeled as positive with respect to the same one of the classes;
f) a heuristic which identifies when there is insufficient overlap between unlabeled objects in the training data and the label groups that include digital objects which are labeled as positive with respect to one of the classes;
g) a heuristic which identifies when there are unlabeled objects in the training data whose score vectors do not overlap any of the label groups that include digital objects which are labeled as positive with respect to one of the classes;
h) a heuristic which identifies when there are unlabeled objects in the training data whose score vectors overlap one of the label groups that include digital objects which are labeled as positive with respect to one of the classes; and i) a heuristic which identifies when there are clusters of labeled objects in the training data that are labeled as negative;

a recommendation component for outputting recommendations based on results of the applied heuristics to improve the training data; and a processor which implements the categorizer, clustering component, evaluation component, and recommendation component.

29. The system of claim 28, wherein the system includes at least two heuristics selected from the group of heuristics.

30. The system of claim 28, wherein in a) the heuristic includes:
for each positive label group, computing a representative score vector based on the score vectors of the digital objects in that positive label group;
computing a first distance from a first score vector of a digital object of a first of the positive label groups to the representative score vector of the first of the positive label groups;
computing a second distance from the first score vector to the representative score vector of a second of the positive label groups; and
comparing the first distance to the second distance;

in b) the heuristic includes:
clustering the score vectors in a label group into a plurality of clusters; and
determining whether a standard deviation for at least one of the clusters is less than a maximum standard deviation computed over a set of the label groups;

in c) the heuristic includes:
computing a standard deviation for a positive label group based on the score vectors of the digital objects in that positive label group; and
comparing the standard deviation for the positive label group to a maximum standard deviation computed over a set of the label groups;

in d) the heuristic includes:
computing a representative score vector for a positive label group based on the score vectors of the digital objects in that positive label group; and
determining whether the score vector of an object with a neutral label is closer to the representative score vector for the positive label group than any of the score vectors of the objects in that positive label group;

in e) the heuristic includes:
computing a representative score vector for the positive label group in which the digital objects are labeled as positive with respect to the same one of the classes based on the score vectors of the digital objects in the positive label group; and
determining whether the score vector of the digital object with the neutral label is further from the representative score vector than a representative distance of the positive label group, the representative distance based on the score vectors and the representative score vector of the positive label group;

in f) the heuristic includes:
computing a representative score vector for each of the positive label groups based on the score vectors of the digital objects in the respective positive label group; and
for all of the unlabeled objects in the training set, determining whether the score vector of the unlabeled object is further from the representative score vector for all of the positive label groups than an average distance of the score vectors of the objects in that positive label group from the representative score vector;

in g) the heuristic includes:
computing a representative score vector for each of the positive label groups based on the score vectors of the digital objects in the respective positive label group; and
for each of the unlabeled objects in the training set, determining whether the score vector of the unlabeled object is further from the representative score vector for all of the positive label groups than a furthest of the score vectors of the objects in that positive label group;

in h) the heuristic includes:
computing a representative score vector for each of the positive label groups based on the score vectors of the digital objects in the respective positive label group; and
for each of a set of unlabeled objects in the training set, determining whether the score vector of the unlabeled object is closer to the representative score vector for at least one of the positive label groups than an average of the score vectors of the objects in that positive label group; and in i) the heuristic includes:
clustering digital objects in the training data that are labeled as negative with respect to all of the classes, based on their score vectors;
determining a standard deviation for each of the clusters based on the score vectors of the digital objects in the cluster; and
determining whether the standard deviation of the cluster has a smaller standard deviation than a maximum standard deviation computed based on positively labeled digital objects.

31. The system of claim 28, wherein the metrics include metrics selected from the group consisting of:
a representative score vector which is computed for a label group, category group, or cluster as an optionally weighted average of the score vectors in the respective label group, category group, or cluster;
a relative distance for a score vector in a label group, category group, or cluster to the representative score vector of that label group, category group, or cluster;
a representative distance computed based on the relative distances for the digital objects in label group, category group, or cluster;
a maximum distance computed based on a distance from the representative score vector to the most distant score vector in the respective label group, category group, or cluster;
a standard deviation computed based on the distances of each score vector in a label group, category group, or cluster to a central vector; and
a maximum standard deviation which is a maximum of the standard deviations of each the label groups, category groups, or clusters.

32. A computer-implemented method of generating suggestions for modifying a training set of digital objects, the method comprising:
receiving from a submitter, a labeled training set of digital objects, the training set further comprising:
a set of classes for identifying content of digital objects; and
for each digital object in the training set, a plurality of labels, one label for each class, the one label for each class indicating that the digital object is positive, negative, or neutral for the respective class;

grouping the digital objects in the labeled training set into positive label groups, one positive label group for each class in the set of classes, each label group comprising digital objects having a label indicating the digital object is positive for the respective class;

with a categorizer which has been trained on a set of multiple categories, assigning a score vector to each digital object in the labeled training set of digital objects, the score vector comprising a score for each category of the set of categories;

computing a representative score vector for each positive label group based on the score vectors of the digital objects in the respective positive label group;

applying heuristics including at least one of a first heuristic and a second heuristic and making recommendations to the submitter based on the applied at least one of the first and second heuristics, the first heuristic including computing a first distance from a first score vector of a digital object of a first of the positive label groups to the representative score vector of the first of the positive label groups, computing a second distance from the first score vector to the representative score vector of a second of the positive label groups, and comparing the first distance to the second distance; and the second heuristic including computing a maximum standard deviation as a function of the distance of each score vector in the labeled training set from a central vector, identifying at least two clusters within the negative label group using a clustering algorithm, computing a standard deviation of each of the two clusters, and comparing the standard deviation of each of the two clusters to the maximum standard deviation; and the recommendations to the submitter comprising:

for the first heuristic, if the first distance is greater than the second distance, proposing to the submitter at least one of: merging the first and second positive label groups into a common label group, and labeling the digital objects of the first of the positive label groups as neutral with respect to the second of the positive label groups;

for the second heuristic, if the standard deviation of at least one of the two clusters is lower than the maximum standard deviation, suggesting to the submitter that a new class be added to the set of classes.

33. The method of claim 32, wherein at least one category in the set of categories is not present in the set of classes.

* * * * *